United States Patent Office 3,236,683
Patented Feb. 22, 1966

3,236,683
METHOD OF COATING METAL WITH A VINYLIDENE CHLORIDE COPOLYMER AND POLYEPOXIDE REACTION PRODUCT AND ARTICLE PRODUCED THEREBY
Morris B. Berenbaum and Riad H. Gobran, Levittown, Pa., assignors to Thiokol Chemical Corporation, Bristol, Pa., a corporation of Delaware
No Drawing. Filed Oct. 11, 1962, Ser. No. 230,001
20 Claims. (Cl. 117—132)

The present invention relates to novel, coated metal structures and to the novel process whereby they may be obtained. In particular, this invention relates to novel structures comprising a metal substrate and a cured organic coating bonded thereto, wherein the coating is the reaction product of polyepoxides and copolymers of vinylidene chloride and an α,β-unsaturated carboxylic acid or anhydride, and to the novel process whereby such structures may be produced.

An object of this invention is to provide novel, coated metal structures which may be used both as structural and decorative elements, and which possess unusual resistance to corrosion such as would occur due to attack by chemicals, including solvents.

Another object of this invention is to provide novel, coated metal structures which may be readily and economically produced.

Yet another object of this invention is to provide novel, coated metal structures which require no prime coat or anchoring agent in the production thereof.

Still another object of this invention is to provide novel, coated metal structures which may be heat and/or pressure laminated to other substrate materials.

A further object of this invention is to provide novel coated metal structures the coatings of which are heat sealable and which form a barrier substantially impermeable to the passage therethrough of water vapor.

Other objects will become apparent from the detailed descriptions which follow.

Although coated metal structures are known to the art, and are used in the main as structural elements for support as well as protective purposes, i.e., to provide some measure of resistance to the weathering effects produced by the natural elements of wind and rain, prior to the advent of the present invention no known structures consisting of a metal substrate and an organic coating have provided all the aspects of utility and versatility in one structure as are provided by the coated structure, of the present invention which (a) provide protection against corrosion, chemical and solvent attack; (b) allow for economical "on site" or factory fabrication; (c) require no prime coat or anchoring agent in the production thereof; (d) have in the coating a heat sealable component which will also provide a barrier substantially resistant to the passage of water vapor therethrough, and (e) provide a coating capable of being heat and pressure laminated to other substrates such as metal, polyolefins, rubber, wood, concrete, fused siliceous matter, etc.

It has been unexpectedly discovered, according to this invention, that all these desired features may be obtained if the structures are formed from a metal substrate such as iron, steel, tin-plate, chrome-plate, zinc, aluminum, etc., and an organic coating bonded thereto and prepared from the reaction products by polyepoxides and copolymers of vinylidine chloride and at least one α,β-unsaturated carboxylic acid or anhydride.

The vinylidene chloride copolymers of the present invention are relatively low molecular weight particulate materials which contains about 75 to 95 and preferably about 85 mol percent of vinylidene chloride and about 5 to 25 and preferable about 15 mol percent of at least one unsaturated α,β-carboxylic acid such as acrylic, methacrylic, itaconic and crotonic acids or anhydrides of such acids. They are random copolymers which are soluble in selected solvents such as tetrahydrofuran, ethyl acetate, acetone, methyl ethyl ketone, methyl isobutyl ketone, dimethyl formamide and dioxane and cosolvent systems such as those containing at least 50% by volume of tetrahydrofuran and at least one solvent diluent such as toluene and methylene chloride.

The copolymers are preferable formed by means of a free radical polymerization reaction using about 0.1 to 4% by weight of a catalyst such as azobisisobutyronitrile or benzoyl peroxide. The reaction is preferably conducted in solution in a solvent such as methylisobutylketone, methyl ethyl ketone, acetone or 50/50 (by volume) acetone/toluene. The polymerization may also be conducted in a solvent such as hexane, methanol or isopropanol in which case the polymer precipitates out to form a slurry. The polymerization reaction may also be conducted using suspension and emulsion polymerization techniques. The copolymers produced should preferably be freed of heavy metal contaminants, such as iron, for stability purposes.

The polyepoxides which may be used in the novel process of the present invention are those which contain an average of more than one epoxide

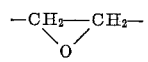

group per molecule and which are soluble in the desired solvent. Generally speaking, all the polyepoxide materials commercially available today may be used in the processes of the present invention, whether they are solid or liquid materials. The polyepoxy materials which can be cured with the above described copolymers are preferable those materials which have an average epoxy functionality of more than one and preferably they are materials which contain an average of at least approximately two epoxide groups per molecule of the polyepoxy material. The position of the epoxide groups in the polyepoxy material is not critical. For instance, if the polyepoxy material is essentially linear in structure the epoxide groups may be in a terminal position or they may be positioned intermediately and/or randomly along the linear structure. Polyepoxy materials which may be cured with the above defined copolymers include the following types of materials.

(1) Essentially linear types such as:

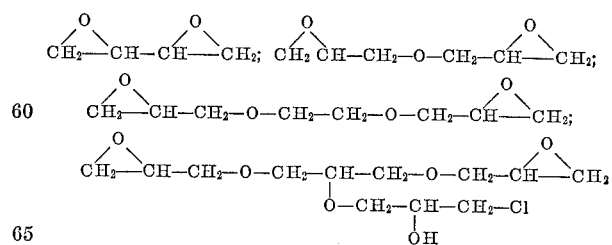

homopolymers and copolymers of glycidyl acrylate and preferably a copolymer of vinylidene chloride and glycidyl acrylate and the epoxidized polybutadiene materials such as those which have an epoxide functionality of four or more and which are sold by Food Machinery Corporation under the designation "Oxiron" resins (i.e., "Oxiron 2000," "Oxiron 2001" and "Oxiron 2002").

(2) Bisphenol A/epichlorohydrin types which are aromatic in nature and which include those sold by the Thiokol Chemical Corporation under the trademark designation "Tipox" (i.e., "Tipox A"; "Tipox B"; "Tipox C"), those sold by the Shell Chemical Company under the designation "Epon" resins, i.e., "Epon 828" and those sold by Union Carbide Chemicals Company under the designation "Bakelite ERL" resins.

(3) Cycloaliphatic types which include those sold by Union Carbide Chemicals Company under the designation "Unox" resins, i.e., "Unox 206," which is epoxy ethyl-3,4-epoxy cyclohexane, "Unox 201" which is 3,4-epoxy-6-methylcyclohexylmethyl - 3,4 - epoxy - 6 - methylcyclohexanecarboxylate, "Unox 221" which is 3,4-epoxy-cyclohexylmethyl-3,4-epoxy cyclohexane carboxylate, and "Unox 289," which is bis (3,4-epoxy-6-methylcyclohexylmethyl) adipate.

(4) Resorcinol diglycidyl ether types which include those sold by Koppers Chemical Corporation under the designation "Kopoxite" resins (i.e., "Kopoxite 159").

(5) Epoxy novolak types (alkyl novolak resins) which are a phenolic/epoxy type system and which include the resins sold by Dow Chemical Corporation under the designation "Dow Epoxy Novolak 438" or "DEN 438–EK 85" which contains 85% of the resin and 15% methyl ethyl ketone as a solvent and the resins sold by Koppers Chemical Corporation under the designation "KER" resins (i.e., "KER 357A" and "KER 955A").

(6) Epoxidized fatty acid resins including the Epoxol materials sold by Swift and Company such as "Epoxol 9–5" (epoxidized linseed oil) and "Epoxol 7–4" (epoxidized soy bean oil; the "Flexol resins sold by Union Carbide Chemical Company, such as "Flexol EP–8" (2-ethyl hexyl epoxy tallate), "Flexol EPO" (epoxidized soy bean oil) and "Flexol TPO" (epoxidized soy bean oil) and "Paraplex G62" (epoxidized soy bean oil) sold by Rohm & Haas.

(7) Epoxidized silicone oil types such as that marketed by Dow Corning under the trade name "Epoxy Silicone QZ," e.g., Epoxy Silicone QZ8–0914.

The higher the functionality of the polyepoxide compound, the tighter the cure that is obtained usually, all other factors remaining the same and for some applications such higher functional polyepoxide materials are preferred. The use of glycidyl acrylate copolymers, such as, a copolymer of vinylidene chloride and glycidyl acrylate is preferred in those applications where a less plasticized coating is desired for better coating surface properties.

"Tipox B" resin is preferred for those coatings requiring good clarity and heat sealing properties.

The polyepoxide/copolymer solution systems of the present invention offer unique handling and processing advantages to the trade. They are essentially one package curing systems and some, notably those made with vinylidene chloride/glycidylacrylate copolymers are stable for extended periods of time. Their solids content can be readily varied to meet the need for various types of applications. Those in the trade seem to prefer a solution having a solids content of about 15 to 35% by weight. By solids content it is meant the percent by weight of those components of the solutions which are not solvents, even though one or more of the other components, such as the polyepoxide materials, may be liquid under normal conditions.

The solution nature of these systems also provides for a facile incorporation therein of adjuvant materials such as pigments, dyes, delustrants, plasticizers, waxes, fillers, stabilizers, etc., when desired. Solvents which may be used in the preparation of the coating solutions of the present invention include the common organic solvents known to those in the art such as methyl ethyl ketone, tetrahydrofuran, methyl isobutyl ketone, cellosolve acetate, diacetone alcohol, toluene, chloroform, acetone, cyclohexanone, methanol, butyl Cellosolve acetate, trichloroethylene, ethanol, dimethyl formamide, methylene chloride, xylol, dioxane, benzene, butyl acetate and Solvesso 150, a commercially available hydrocarbon solvent blend used alone or in combination with one another. The preferred solvent is a 50/50 by volume mixture of ethylacetate and methyl ethyl ketone. The use of this solvent tends to produce the clearest coatings.

In the coating process according to the present invention, a solution containing the polyepoxide and the copolymer is applied to the surfaces of the metal substrate on one or more sides thereof as desired so as to provide each surface being coated with a film which can be as low as 0.01 mil in thickness after the removal of the solvent therefrom. The thickness of the film may be varied by varying the coating system being used as well as by varying the viscosity of the coating solution. The coatings may be applied by any of the commonly used dipping, brushing, roller coating, etc., techniques known to the art. The viscosity of the coating solution may be varied to suit the manner of application by adjusting the solids content of the coating solution. After the coating solution is applied to the substrate, the solvent is removed therefrom preferably at elevated conditions of up to 250° F. and with forced draft conditions. The temperatures to be employed depend on the solvent and/or the thickness of the desired coating. At the higher temperatures the removal of the solvent and the simultaneous crosslinking of the copolymer and the polyepoxide can be accomplished in a matter of seconds. At lower temperatures, a longer time is required to remove the solvent and cure the coating. The crosslinking reaction involves the reaction of the carboxyl groups of the copolymer with the epoxy groups, of the polyepoxide. About 0.01 to 2.5 and preferably about 0.1 to 1.0 mol of epoxide moieties should be provided per mol of carboxyl moieties to insure adequate crosslinking sites. Catalysts such as tertiary amines, $BF_3$ and $BF_3$ complexes may be used to facilitate the crosslinking reaction when using certain of the polyepoxide materials such as the epichlorohydrin/bisphenol A type. Useful products may be obtained with these polyepoxides, however, without the use of such catalysts.

The coatings produced according to the present invention are normally crosslinked and/or chain extended into a very high molecular weight form with the application of heat, yet they retain very excellent heat sealing properties.

The coatings prepared according to the present invention have much better solvent, grease and scratch resistant properties and are much more resistant to the passage of moisture therethrough than the coatings presently available largely due to the crosslinked and/or chain extended nature of the coatings of the present invention.

The carboxylic acid moieties supply the copolymers of the present invention, for the most part, with its solubility properties in addition to supplying the copolymer with the carboxyl groups needed to subsequently anchor the coating to the metal substrate and crosslink with the epoxy groups of the polyepoxide compounds. The solubility of the copolymers can also be varied, if desired, by varying the molecular weight of the copolymer. The vinylidene chloride units of the copolymer help to supply the needed vapor impermeability and grease resistant properties to the crosslinked coating. The polyepoxide materials supply the epoxide groups needed to crosslink the copolymer via its carboxyl groups. It is the crosslinked and/or chain extended nature of the coatings of the present invention which provides its excellent solvent resistant properties. The polyepoxide materials also probably imparts adhesive and plasticized properties to the cured coating. The liquid polyepoxides also set as cosolvents for the copolymer. It can be readily seen, therefore, that the novel structures of the present invention provide those in the art with a versatile coating system, the components and/or amounts of the components of which can be readily changed so as to provide for the needs of a vast variety of end use applications.

The following examples are merely illustrative of the present invention and are not intended as a limitation upon the scope thereof.

EXAMPLES 1–15

Among the vinylidene chloride copolymers which may be used to form part of the curable compositions useful in the practice of the present invention are those of vinylidene chloride ($VCl_2$) and acrylic acid (AA). Curable copolymers made from those monomers were prepared by solution polymerization as illustrated in Tables I and II below. They represent a wide range of compositions, produced using several solvent systems, e.g., solvent A=methylisobutylketone; solvent B=acetone; solvent C=1:1 vol./vol. mixture of acetone and toluene, solvent D=methylethyl ketone and several free radical polymerization initiators, e.g., initiator A=azobisisobutyronitrile; initiator B=benzoyl peroxide, under various polymerization conditions of temperature and time, to provide reactive copolymers at various percentages of conversion of the monomers. In preparing these copolymers, the respective initiators were dissolved in the solvent used and the monomers were then added to the initiator solution. The reactions were conducted under nitrogen in a sealed reaction vessel under autogenous pressure.

The resin products obtained were soluble in the pot product mixture. They were separated therefrom by precipitation from solution through the addition of ice and water to the pot products, and by a subsequent filtering, fragmentation, washing with water, further filtering and a subsequent drying of the solid copolymers under vacuum at about 50° C. The copolymers, when dried, are white, particulate materials. Using vapor osmometric techniques it has been found that copolymers produced in this manner have number average molecular weights of about 10,000±2,000.

EXAMPLE 16

Stock polyepoxide solutions 1 to 18 were prepared so as to contain 15% solids using Oxiron 2000 resin in Cellosolve acetate (solution 1), diacetone alcohol (solution 2), and toluene (solution 3); Tipox B resin in methyl isobutyl ketone (solution 4), chloroform (solution 5) and Solvesso 150/Cellosolve acetate (in 9/1 wt./wt. ratio) (solution 6); Unox 221 resin in acetone (solution 7), cyclohexanone (solution 8) and methanol (solution 9); Kopoxite 159 resin in butyl Cellosolve acetate (solution 10), trichloroethylene (solution 11) and ethanol (solution 12); KER 357–A resin in dimethyl formamide (solution 13), methylene chloride (solution 14) and xylol (solution 15) and Epoxol 9–5 resin in dioxane (solution 16), benzene (solution 17) and butyl acetate (solution 18).

Further, two stock solutions of a $VCl_2AA$ copolymer were prepared: Solution I contained 15% solids in tetrahydrofuran and Solution II contained 15% solids in a 1:1 mixture by weight of methyl ethyl ketone and ethyl acetate. The copolymer contained vinylidene chloride and acrylic acid in an 84.5/15.5 mol ratio and was made as in Examples 1 to 15.

Coating solutions A to R were then prepared by mixing together various weights of the stock polyepoxide and $VCl_2/AA$ copolymer solutions according to the schedule in Table III, below, to produce solutions containing epoxide/carboxyl ratios in equivalents of 2, 1 and 0.5.

*Table I*

| Example | Charge | | Charge, mol percent $VCl_2/AA$ | Initiator | | Solvent | |
|---|---|---|---|---|---|---|---|
| | $VCl_2$, g. | AA, g. | | In grams | Type | In ml. | Type |
| 1 | 63 | 25 | 65/35 | 2 | A | 150 | A |
| 2 | 73 | 17 | 75/25 | 2 | A | 150 | A |
| 3 | 155 | 29.6 | 80/20 | 4 | A | 240 | A |
| 4 | 78 | 14 | 80/20 | 2 | A | 150 | A |
| 5 | 78 | 14.4 | 80/20 | 2 | A | 150 | A |
| 6 | 3,220 | 496 | 83/17 | 30 | A | 6,000 | D |
| 7 | 161 | 25 | 83/17 | 4 | A | 300 | A |
| 8 | 161 | 24.5 | 83/17 | 4 | A | 300 | C |
| 9 | 161 | 24.5 | 83/17 | 4 | A | 300 | D |
| 10 | 161 | 24.5 | 83/17 | 6 | B | 300 | C |
| 11 | 161 | 24.5 | 83/17 | 6 | B | 300 | D |
| 12 | 83 | 10.8 | 85/15 | 2 | A | 150 | A |
| 13 | 83 | 10.8 | 85/15 | 2 | A | 150 | A |
| 14 | 171 | 17 | 88/12 | 4 | A | 300 | A |
| 15 | 87 | 7.2 | 90/10 | 2 | A | 150 | A |

*Table II*

| Example | Reaction | | | Resin product characterization | |
|---|---|---|---|---|---|
| | Time, hrs. | Temp., ° C. | Conversion, percent | Mol percent, $VCl_2/AA$ | G. eq. COOH/ 100 g. resin |
| 1 | 5 | 60 | 57 | 72/28 | 0.32 |
| 2 | 4 | 60 | | 79/21 | 0.22 |
| 3 | 16 | 65 | 85 | 82/18 | 0.19 |
| 4 | 4 | 60 | 32 | 83/17 | 0.18 |
| 5 | 17 | 60 | 85 | 83/17 | 0.19 |
| 6 | 6 | 65 | 61 | 83.9/16.1 | 0.173 |
| 7 | 3 | 65 | 53 | 84/16 | 0.17 |
| 8 | 5 | 65 | 63 | 84/16 | 0.17 |
| 9 | 5 | 65 | 61 | 85/15 | 0.161 |
| 10 | 5 | 65 | 33 | 85/15 | 0.161 |
| 11 | 5 | 65 | 38 | 86/14 | 0.149 |
| 12 | 4 | 60 | 33 | 87/13 | 0.13 |
| 13 | 1 | 85 | 55 | 87/13 | 0.14 |
| 14 | 3 | 65 | 55 | 90/10 | 0.11 |
| 15 | 1 | 85 | 56 | 91/9 | 0.10 |

*Table III*

| Coating solution formed | Polyepoxide solution used | Grams of polyepoxide solution used | $VCl_2/AA$ solution used | Grams of $VCl_2/AA$ solution used | Ratio epoxide/ carboxyl equivalents in the coating solutions |
|---|---|---|---|---|---|
| A | 1 | 60 | I | 100 | 2 |
| B | 2 | 30 | I | 100 | 1 |
| C | 3 | 15 | I | 100 | 0.5 |
| D | 4 | 64 | I | 100 | 2 |
| E | 5 | 32 | I | 100 | 1 |
| F | 6 | 16 | I | 100 | 0.5 |
| G | 7 | 44.6 | I | 100 | 2 |
| H | 8 | 22.3 | I | 100 | 1 |
| I | 9 | 11.2 | I | 100 | 0.5 |
| J | 10 | 43 | I | 100 | 2 |
| K | 11 | 21.5 | II | 100 | 1 |
| L | 12 | 10.75 | II | 100 | 0.5 |
| M | 13 | 66.6 | II | 100 | 2 |
| N | 14 | 33.3 | II | 100 | 1 |
| O | 15 | 16.7 | II | 100 | 0.5 |
| P | 16 | 5.9 | II | 100 | 2 |
| Q | 17 | 29.5 | II | 100 | 1 |
| R | 18 | 15 | II | 100 | 0.5 |

Various metal substrates were dip coated with each of coating solutions A to R and cured at 83° F., for about 16 hours.

Adhesion of the coatings to the substrates is described in Table IV, below. The coatings were scored with a razor to form a diamond shaped cut. Pressure sensitive tape (cellophane-type) was pressed onto the cut areas and surrounding coated surface, and then quickly removed by pulling. Where the coating delaminated it was given a rating of D, where it partially delaminated a rating of PD, where very little delamination occurred a rating of LD, and where no delamination occurred, a rating of A was given.

Table IV

| Type coating | Adhesion to substrate | | | | | |
|---|---|---|---|---|---|---|
| | Aluminum | Zinc [1] | Chromium | Tin [1] | Iron | Cadmium [1] |
| A | D | A | A | A | A | A. |
| B | D | A | D | A | A | A. |
| C | D | D | A | A | A | A. |
| D | A | A | A | A | A | A. |
| E | A | A | A | A | A | D. |
| F | A | A | A | A | A | A. |
| G | D | PD | A | A | A | A. |
| H | D | LD | D | A | A | A. |
| I | D | A | A | A | A | A. |
| J | A | A | A | A | A | A. |
| K | LD | A | A | A | A | A. |
| L | A | A | A | A | A | A. |
| M | A | A | A | A | A | A. |
| N | A | D | A | A | LD | A. |
| O | A | A | A | A | A | A. |
| P | A | A | A | A | A | A. |
| Q | D | A | A | A | A | A. |
| R | D | A | A | A | A | A. |

[1] Plated on steel.

EXAMPLE 17

Strands of copper wire were twisted together and dip coated with each of coating solutions A to R of Example 17 and cured at 83° F. for about 16 hours. A microscopic examination of the coated substrates showed good adhesion of the coating to the substrate with no evidence of delamination.

EXAMPLE 18

Two stock solutions were prepared: Solution Y being 15% solids of an 84.5/15.5 mol ratio $VCl_2$/AA copolymer prepared as in Examples 1–15 in tetrahydrofuran, and Solution Z being 45 g. of the epoxidized silicone oil Epoxy Silicone QZ8–0914 in 25 g. of toluene (this oil has an epoxide equivalent of 185). A coating solution was then prepared to contain a 1/1 ratio of equivalents of epoxide/carboxyl by mixing together 31 g. of Solution Z with 100 g. of Solution Y. Various metal substrates i.e., copper, aluminum, iron, and zinc, tin, cadmium and chromium plated on steel, were then dip coated with this coating solution at room temperature and the resulting coatings were cured in air for about 15 minutes at 78° F. to produce coated objects wherein the adhesion of the cured coating to the substrate was excellent in each case.

EXAMPLES 19–20

In these examples the metal substrate aluminum was dip coated with coating solutions of an 84.5/15.5 mol ratio $VCl_2$/AA copolymer produced as in Examples 1 to 15 and Oxiron 2000 and Unox 201 resins in a 1:1 wt.: wt. tetrahydrofuran: toluene solvent vehicle. The coated panels were air dried at ambient temperatures (80–90° F.) for 30 minutes and then baked for 3 minutes at 310° F. The coated structures were then tested for adhesion of the coating to the substrate using a diamond-shaped scoring of the coating and a pressure sensitive tape delamination procedure such as is described in Example 17. The coating solution recipes and the adhesion test results are listed in Table V, below.

Table V

| Substrate | Example | |
|---|---|---|
| | 19 | 20 |
| | Aluminum | Aluminum |
| Coating solution recipe, parts by weight: | | |
| $VCl_2$/AA copolymer | 14.97 | 12.5 |
| Oxiron 2000 resin | 0.029 | |
| Unox 201 resin | | 2.5 |
| Solvent | 85.0 | 85.0 |
| Equivalent ratio: Epoxide/carboxyl | 0.001/1 | 0.1/1 |
| Cure conditions: | | |
| Min. at 80–90° F | 30 | 30 |
| Min. at 310° F | 3 | 3 |
| Adhesion test | A | A |

A=No delamination.

EXAMPLES 21–25

Coatings made in accordance with the practice of the present invention show unusual resistance to erosive abrasion, as shown in Table VI, below. $VCl_2$/AA (84.5/15.5 mol ratio) copolymers (made as in Examples 1 to 15) and various polyepoxides were used with various solvents to make coating solutions which were applied to and cured on steel panels. The coatings thus obtained were then subjected to abrasion tests as described in ASTM procedure D1044–56.

Table VI

| Example | 21 | 22 | 23 | 24 | 25 |
|---|---|---|---|---|---|
| Recipe, parts by weight: | | | | | |
| $VCl_2$/AA copolymer | 100 | 100 | 100 | 100 | 100 |
| Unox 201 resin | 13.5 | | | | |
| Unox 289 resin | | 17.3 | | | |
| Epoxol 9–5 resin | | | 14.5 | | |
| Epoxol EPO resin | | | | 16.8 | |
| Tipox B resin | | | | | 15.6 |
| THF/Toluene [1] | 170.0 | 176.1 | 171.8 | 174.9 | 173.3 |
| COOH/Epoxide ratio in coating solution | 2 | 2 | 2 | 2 | 2 |
| Cure at 25° C., hrs | 3.5 | 3.5 | 3.5 | 3.5 | 3.5 |
| Cure at 150° C., min | 3.5 | 3.5 | 3.5 | 3.5 | 3.5 |
| Abrasion resistance [2] | 17.7 | 13.6 | 8.2 | 9.1 | 40.7 |

[1] Tetrahydrofuran/toluene solvent mixture, 1:1 by weight.
[2] Taber Abrader CS 10 wheel, 500 g. weight, 1,000 cycles.

EXAMPLE 26

Coatings used in the practice of the present invention exhibit excellent resistance to attack by solvents and corrosive chemicals such as is shown in Table VII below.

Coating solutions comprising 100 parts by weight of an 84.5/15.5 mol ratio, $VCl_2$/AA copolymer produced as in Examples 1 to 15, 80 parts by weight of Tipox A polyepoxide, 3 parts by weight of boron trifluoride monoethylamine and 183 parts by weight of methyl ethyl ketone were prepared, spread onto a glass cloth substrate and permitted to dry. Two layers of the thus coated substrate, with coated sides in face to face contact, were subjected to 1000 p.s.i. and 300° F. for one hour. The laminated product obtained had a resin content of 29% by weight; it was then immersed in various liquid solvents and corrosive chemicals for one week (7 days) at 70° F. The tests conducted are described in ASTM D543–56T procedure, and the results obtained are as listed in Table VII.

Table VII

| Immersion medium | Cured Coating | |
|---|---|---|
| | Percent weight increase | Percent thickness increase |
| 30% H$_2$SO$_4$ | 1.42 | 5.86 |
| 3% H$_2$SO$_4$ | 0.94 | 6.72 |
| 10% NaOH | 0.51 | No change |
| 1% NaOH | 1.46 | 0.67 |
| 95% ethanol | 2.84 | 7.46 |
| 50% ethanol | 1.53 | No change |
| Acetone | 10.25 | 21.1 |
| Ethyl acetate | 13.12 | 26.3 |
| Ethylene dichloride | 18.6 | 39 |
| CCl$_4$ | 0.533 | No change |
| Toluene | 3.45 | 7.86 |
| Heptane | 0.29 | No change |
| 10% NaCl | 0.97 | No change |
| Phenol | 6.5 | 12.3 |
| H$_2$O | 0.3 | No change |

We claim:

1. As an article of manufacture a metal substrate coated on at least one surface thereof with the reaction product of
   (A) at least one copolymer essentially consisting of about 75 to 95 mol percent of vinylidene chloride and about 5 to 25 mol percent of at least one acid material selected from the group consisting of $\alpha,\beta$-unsaturated, aliphatic carboxylic acids and their anhydrides, and
   (B) at least one polyepoxide in an amount such as to provide about 0.01 to 2.5 mols of epoxide groups per mol of carboxyl groups present in said copolymer.

2. An article as in claim 1 in which said polyepoxide contains an average of more than one epoxide group per molecule.

3. An article as in claim 1 in which said acid material is acrylic acid.

4. An article as in claim 1 in which said metal substrate is selected from the group consisting of iron, aluminum, copper, zinc, tin, cadmium and chromium.

5. An article as in claim 1 in which said metal substrate is iron.

6. An article as in claim 1 in which said metal substrate is aluminum.

7. An article as in claim 1 in which said metal substrate is copper.

8. An article as in claim 1 in which said metal substrate is zinc.

9. An article as in claim 1 in which said metal substrate is tin.

10. An article as in claim 1 in which said metal substrate is cadmium.

11. An article as in claim 1 in which said metal substrate is chromium.

12. A process for coating a metal substrate comprising applying to at least one surface of said substrate a solution containing
    (A) at least one copolymer essentially consisting of about 75 to 95 mol percent of vinylidene chloride and about 5 to 25 mol percent of at least one acid material selected from the group consisting of $\alpha,\beta$-unsaturated, aliphatic carboxylic acids and their anhydrides, and
    (B) at least one polyepoxide in an amount such as to provide about 0.01 to 2.5 mols of epoxide groups per mol of carboxyl groups present in said copolymer,
removing the solvent medium from said solution, and crosslinking said copolymer with said polyepoxide whereby said crosslinked copolymer forms a coating on said substrate.

13. A process as in claim 12 in which said metal substrate is selected from the group consisting of iron, aluminum, copper, zinc, tin, cadmium and chromium.

14. A process as in claim 13 in which said metal substrate is iron.

15. A process as in claim 13 in which said metal substrate is aluminum.

16. A process as in claim 13 in which said metal substrate is copper.

17. A process as in claim 13 in which said metal substrate is zinc.

18. A process as in claim 13 in which said metal substrate is tin.

19. A process as in claim 13 in which said metal substrate is cadmium.

20. A process as in claim 13 in which said metal substrate is chromium.

References Cited by the Examiner

UNITED STATES PATENTS 2,662,870  12/1953  Allenby _____ 117—161
3,057,812  10/1962  Straughan et al. _____ 260—45.5

FOREIGN PATENTS 662,577  5/1963  Canada.

RICHARD D. NEVIUS, *Primary Examiner.*

WILLIAM D. MARTIN, *Examiner.*

R. S. KENDALL, *Assistant Examiner.*